Apr. 17, 1923.
R. J. STIMSON
1,451,927
CONTROLLING MEANS FOR TRACTORS
Filed June 29, 1917    4 Sheets-Sheet 1
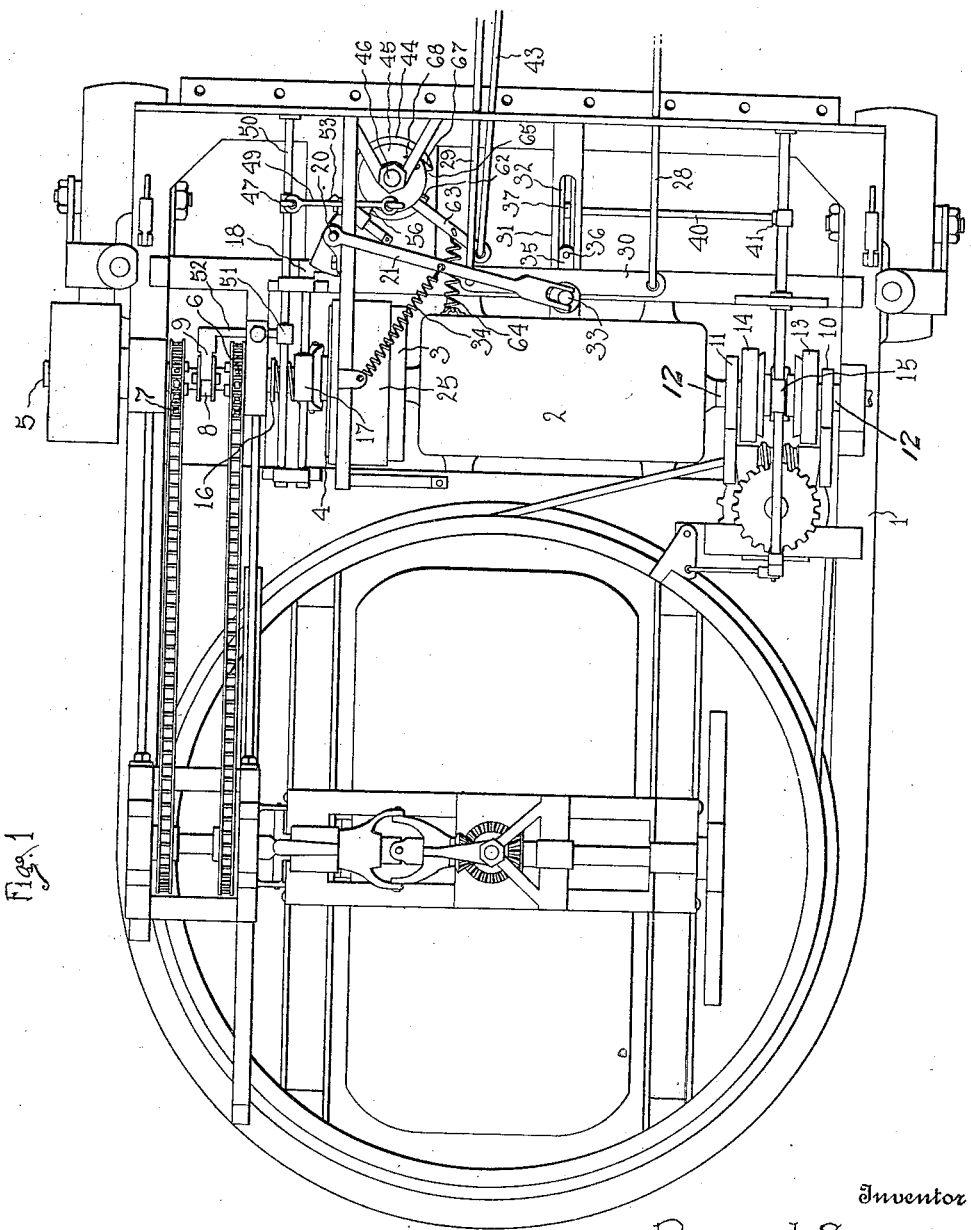
Fig. 1
Witnesses
Arthur F. Draper
Chas. W. Stauffiger
Inventor
Ralph J. Stimson
By 
Attorneys Apr. 17, 1923.
R. J. STIMSON
1,451,927
CONTROLLING MEANS FOR TRACTORS
Filed June 29, 1917
4 Sheets—Sheet 2
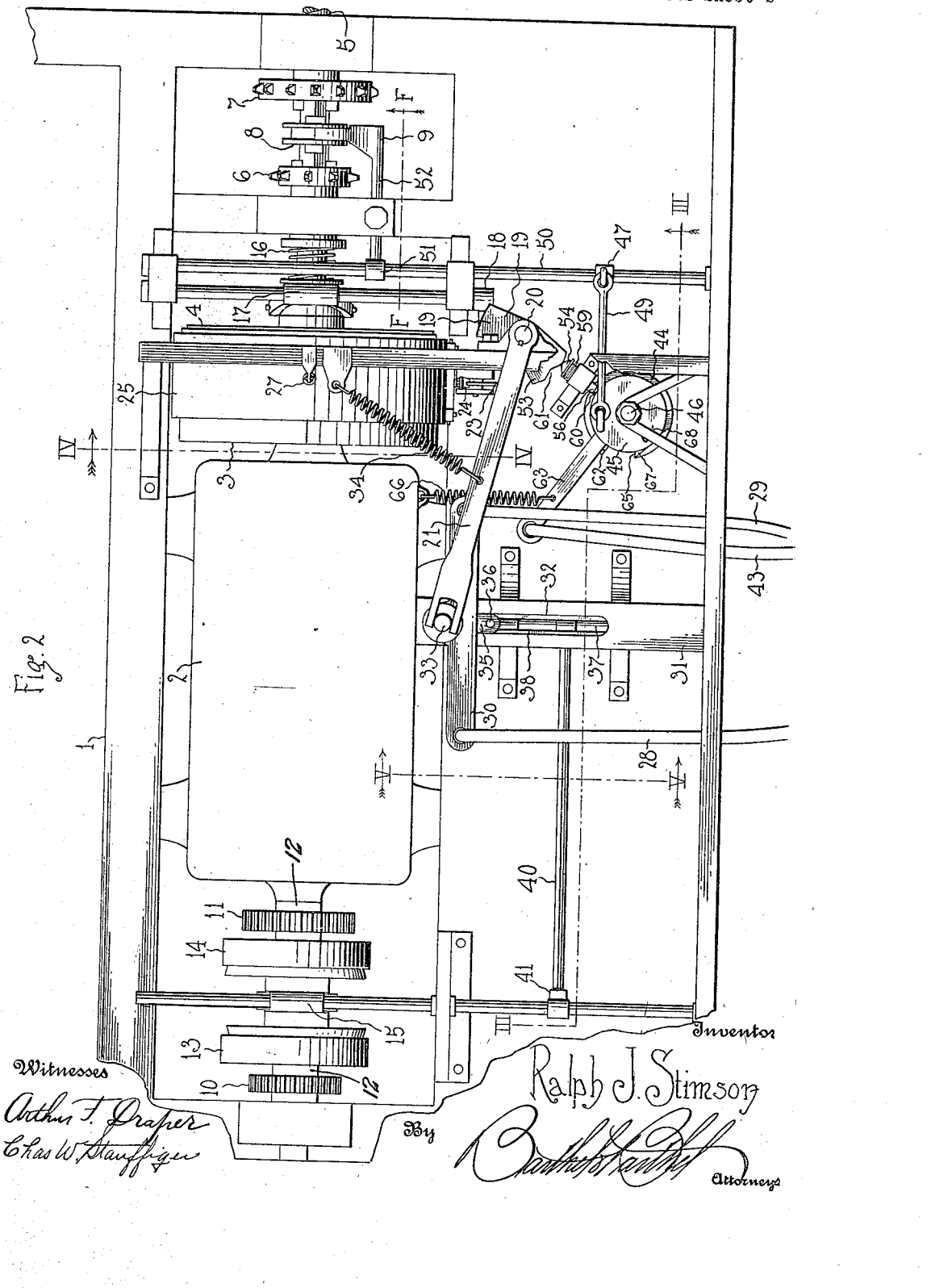

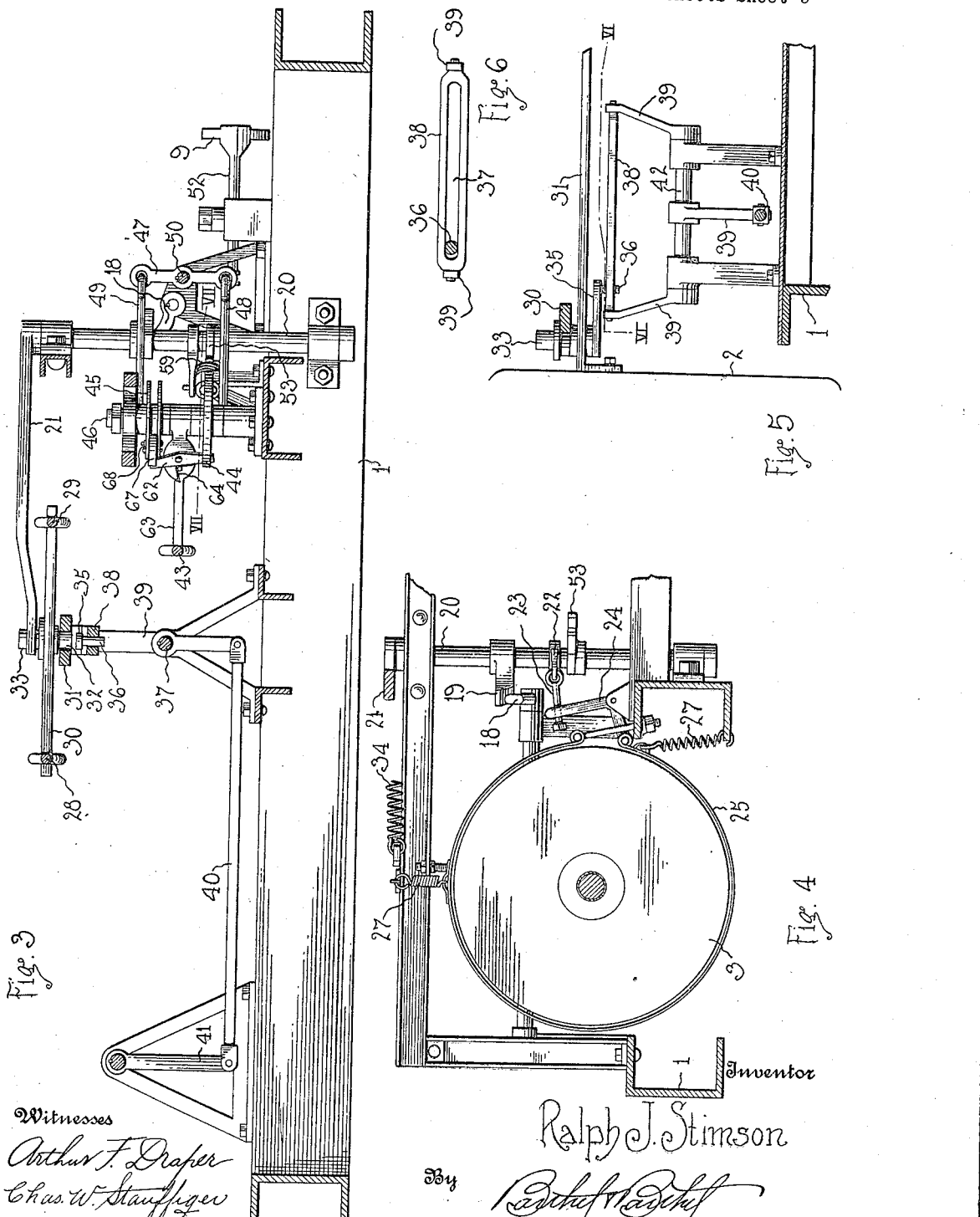

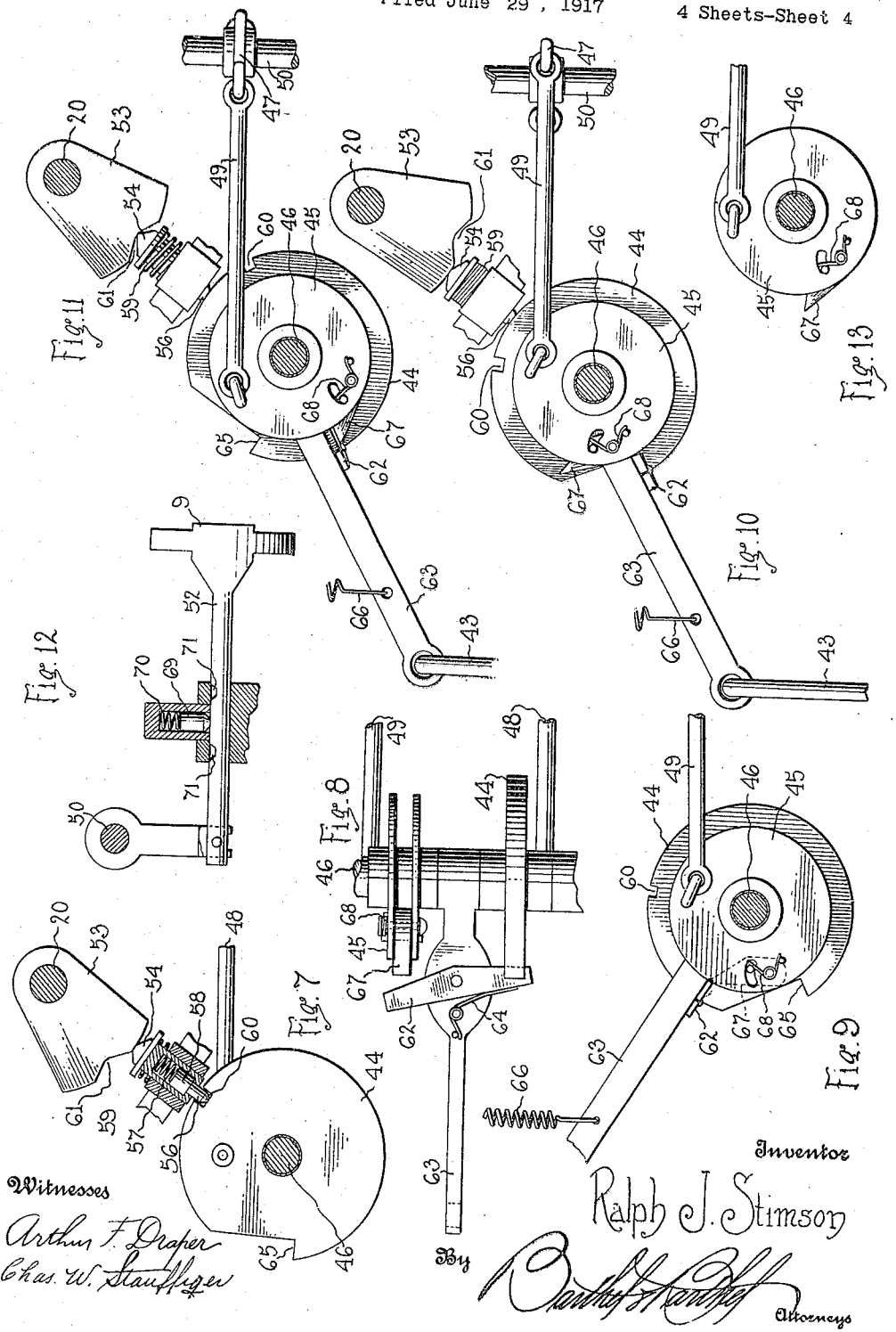

Patented Apr. 17, 1923.

1,451,927

UNITED STATES PATENT OFFICE.

RALPH J. STIMSON, OF ROGERSVILLE, MICHIGAN.

CONTROLLING MEANS FOR TRACTORS.

Application filed June 29, 1917. Serial No. 177,692.

*To all whom it may concern:*

Be it known that I, RALPH J. STIMSON, a citizen of the United States of America, residing at Rogersville, in the county of Genesee and State of Michigan, have invented certain new and useful Improvements in Controlling Means for Tractors, of which the following is a specification, reference being had therein to the accompanying drawings.

This invention relates to the controlling means for a tractor, the object being to enable the operator to completely control the tractor, by flexible connections such as reins, from any position which is most advantageous in attending to the implement being hauled by the tractor. This allows one man to control both the tractor and the implement, which in many cases would require the services of two men were it necessary for the driver to occupy a certain fixed position on the tractor.

The invention consists in the matters hereinafter set forth, and more particularly pointed out in the appended claims.

Referring to the drawings,

Figure 1 is a plan view of a controlling mechanism that embodies features of the invention in connection with a motor and driving gears, showing the position of the parts when the tractor is at rest;

Fig. 2 is a plan view in detail of the mechanism when shifting into gear and with the steering gear in operation;

Fig. 3 is a view in vertical section on or about line III—III of Fig. 2;

Fig. 4 is a view in section on or about line IV—IV of Fig. 2;

Fig. 5 is a view partly in section taken on or about line V—V of Fig. 2;

Fig. 6 is a view partly in section on line VI—VI of Fig. 5;

Fig. 7 is a detail in section on line VII—VII of Fig. 3;

Fig. 8 is a detail in elevation of parts of the speed changing mechanism;

Figs. 9, 10 and 11 are plan views, in various changes of position, of the parts shown in Fig. 8, also the interlocking device and its relation to means of disconnecting the power;

Fig. 12 is a detail of a gear shift lock in section on line F—F of Fig. 2, and

Fig. 13 is a plan view of the top disk shown in Fig. 8.

In the drawings, a tractor frame 1 carries a motor 2 with drum 3 enclosing reverse gearing and a main clutch 4. Through the medium of the clutch and reverse gears, a shaft 5 may be made to rotate either forward or backward or may be disconnected from the power of the motor. Sprockets 6 and 7 are operably connected with the drive wheel of the tractor by suitable means. These sprockets are rotatable on the shaft 5 and may be locked to turn therewith by a positive clutch 8, that may be slid into engagement with either sprocket by a shifting fork 9. In Fig. 1 the shifting fork 9 is shown in neutral position.

Gears 10 and 11 are loosely mounted on a shaft 12 which is an extension of the crank shaft of the motor, and either gear may be rotatably connected with the shaft by a corresponding friction clutch 13 or 14. The male portions of these clutches are connected and always revolve with the shaft 12. A single shifting fork 15 controls both clutches.

The gears 10 and 11 are operably connected with the steering wheel of the tractor, each through any preferred operative connections, one set of gears swinging the steering wheel in a certain direction and the other set turning it in the reverse direction. Thus engagement of one clutch will turn a pilot bearing wheel to the right and engagement of the other clutch will turn it to the left.

The main clutch 4 is normally held in engagement by a spring 16 and may be disengaged by a shifting fork 17 which is fastened to the same shaft as a lever 18. The latter lever 18 is shifted by a cam 19 on a vertical shaft 20 which may be turned by means of a lever 21. The cam 19 is so shaped that it acts on the clutch lever 18 while being turned a certain distance to disengage the clutch, but a continued movement of the cam will not move the clutch farther out of engagement, simply holding it in a fixed position.

Turning of shaft 20 also engages the reverse gearing through an actuating arm 22, link 23 and lever 24 (Fig. 4) which contracts a brake band 25 on the drum 3. The brake band is normally held away from the drum by springs 26 and 27. The link 23 is so connected with the lever 24 that the shaft 20 will be turned a considerable distance before the brake band begins to act on the reverse drum. The reverse gearing is preferably of the planetary type, but the construction does not form a part of this application as any one of several different forms could be used.

When the control lever 21 is in position of rest (Fig. 2) the main clutch 4 will be engaged and shaft 5 will rotate with the motor. Moving the control lever partly back disengages the clutch thereby disconnecting the power from shaft 5. If lever 21 is pulled around still farther the reverse gearing is engaged (the clutch being held out of engagement) and shaft 5 rotates in the reverse direction from that of the motor.

The control lever 21 is actuated by conjoint pull on flexible connections or reins 28 and 29 which are attached to opposite ends of the equalizer or draw bar 30, supported by a frame member 31 which has a slot 32 in which the pivot pin 33 of the draw bar may slide. The pin 33 projects above the draw bar and into the forked end of the control lever 21. Thus a simultaneous pull on the reins 28 and 29 slides the pivot pin 33 in the slot 32 and carries the end of the lever 21 back with it. When the pull on the reins is released the lever 21 is pulled back to normal position by a spring 34.

Below the frame member 31 a crank 35 is attached to the pivot of the draw bar 30, and a pin 36 of the crank projects downward through a slot 37 of a cross member 38 of a lever 39. The cross member 38 is journaled at the ends in the side arms of lever 39 to allow the sides of the slot to keep in alinement with the crank pin 36. The lever 39 is connected by a rod 40 to the lever 41 which is attached to the same shaft as the shifting fork 15 which controls the steering clutches. When the bar 30 is pulled along the slot 32, the crank pin 36 moves a corresponding distance in the slot 37. When the reins 28 and 29 are pulled simultaneously, the crank pin 36 will move along under the center of slot 32 and the lever 39 will not be affected, but if one of the reins is pulled singly the crank 35 will swing with draw bar 30, on the axis 33, the crank pin 36 will be moved to one side and will turn the lever 39 on the pivot axis 42 which will cause a corresponding change in the position of lever 41, and shifting fork 15. Thus when the right hand rein 29 is pulled, the crank 35 is swung to the left and by means of levers 39 and 41 engages the friction clutch 14 which actuates the proper set of gears to swing the pilot wheel to the right. Similarly a pull on rein 28 will engage clutch 13 and steer the tractor to the left. The steering may be done in this manner regardless of the position of the draw bar axis 33 in the slot 32. Thus the tractor may be easily steered while going either forward or backward, or the clutch may be held out of engagement, to stop the tractor, while the steering gear is operated to turn the pilot wheel in position to make a short turn.

A third rein 43 is used to shift the speed changing clutch 8. Disks 44 and 45 are loosely carried on a vertical spindle 46 and are connected with opposite ends of a bar 47 by rods 48 and 49 respectively. The bar 47 is fastened, between the ends, to a shaft 50 to which is also attached a forked lever 51 which slides the rod 52 through its supporting member to change the position of the shifting fork 9. If either of the disks 44 or 45 is turned on the axis 46 in an anti-clockwise direction it pulls the corresponding end of the bar 47 which turns the shaft 50 thereby moving the shifting fork 9 in a certain direction.

As it is important that the positive clutch 8 be shifted into gear only when disconnected from the power of the engine, an interlocking device is placed between disks 44 and a segment 53, carried on the vertical control shaft 20, to prevent the shifting of clutch 8 out of neutral while either the main clutch 4 or the reverse gearing is engaged. A plug 54 contains a spring plunger 56. A spring 57 normally houses the plunger 56 beyond the end of the plug, a head 58 holding it within the proper limits. The solid end of the plug 54 is held against the perimeter of the segment 53 by a spring 59. When the control lever 21 is in position either to allow engagement of the main clutch or to engage the reverse gearing, the segment 53 will hold the bolt 54 toward the disk 44 which will allow the plunger 56 to enter a notch 60, in the perimeter of the disk, thereby holding the disk from turning. As both of the disks 44 and 45 are connected with the bar 47, disk 45 can not be turned when the disk 44 is held from turning therefore the interlock governs the movements of both disks.

When lever 21 is swung partly around to disengage the main clutch, a notch 61, in the perimeter of the segment, is brought opposite the plug 54 which is pushed into it by the spring 59. This pulls the end of the plunger 56 out of the notch 60 far enough to allow the disk 44 to be turned. However, the plunger 56 is not pulled completely out of the notch 60, but, being beveled at the end, is lifted out by the edge of the notch when the disk is turned. This arrangement causes the bolt to find the notch whenever the latter is opposite it and acts as a guide in finding neutral position. If the plug 54 is pushed toward the disk 44 when notch 60 is not in line with the interlock, the spring 57 is compressed to allow the necessary decrease in the combined length of the plug 54 and plunger 56. When the disks are out of neutral position they may be turned back to neutral regardless of the position of segment 53, the plunger 56 will enter the notch 60 as soon as the notch gets to the plug and will hold the disks in neutral position. Thus it is possible to shift out of gear when the power is connected but impossible to shift into gear unless the power is first thrown off.

The disks 44 and 45 are turned by the latch 62 of lever 63 to the end of which the rein 43 is attached. The latch 62 is normally held in contact with the perimeter of disk 44 by a spring 64. Thus with the disks in neutral position, the latch 62 will engage with a notch 65 of disk 44, when lever 63 is pulled around, and turn the disk. This will cause the bar 47 to turn the shaft 50 and lever 51 in a clockwise direction which, by means of shifting fork 9, slides the positive clutch 8 into engagement with the sprocket 6 for low speed transmission. When the lower end of the bar 47 is swung to the left the upper end swings to the right thereby turning the disk 45 in the reverse direction to that in which the disk 44 is turned. When the pull is released on rein 43 the lever 63 is pulled back to its original position by a spring 66. A portion of the perimeter of disk 44 back from notch 65 gradually increases in distance from the center, so that as lever 63 moves back to normal position the lower end of the latch 62 is swung outward against spring 64, the upper end being swung toward the disk 45. The disk 45 has a latch 67 which is normally held outward by a spring 68. As the lever moves back to normal position the latch 62 comes in contact with the latch 67 and pushes it within a recess of disk 45 as shown in Fig. 9. As soon as latch 62 passes latch 67 the latter is again pushed outward by its spring and is in position to be caught by latch 62 the next time rein 43 is pulled. With the parts in this position a pull on the rein 43 will turn the disk 45 in an anti-clockwise direction which will pull the upper end of the bar 47 to the left, turn the shaft 50 anti-clockwise and cause the positive clutch 8 to engage the sprocket 7 thereby throwing the transmission into high gear. Disk 44 will have turned in the opposite direction from disk 45 and the parts will be left in the positions shown in Fig. 11. When lever 63 is released it swings back with latch 62 in position to turn the low speed disk with the next pull on the rein. Thus successive pulls on rein 43 will shift from one speed directly to the other, if the main engine clutch is released, but in each change the parts must pass through neutral position and may be stopped there if desired. As previously explained, only a small part of the plug 56 projects into the notch 60, when the interlock is released, so that when the notch passes the plug there is enough resistance to hold the disks in neutral if desired, but continued pull on the rein will move them into the next gear change.

A gear shift lock, as shown in Fig. 12, may be used to prevent the positive clutch 8 from accidentally getting out of engagement. A stud 69 is held by a spring 70, in contact with the rod 52 of the shifting fork 9 and when clutch 8 is in position to engage either of the sprockets, the bolt enters one of the notches 71. The notches and the end of the bolt are beveled at an angle which will ordinarily hold the shifting fork in position but will yield when the control members are moved.

The sprockets 6 and 7 and the positive clutch 8 do not necessarily form a part of this invention as the speed changing mechanism would work equally well with other forms of transmission. Gears could take the place of the sprockets or fork 9 could be used to shift sliding gears.

A tractor may be operated by the mechanism as follows: After the motor has been started, with the transmission in neutral, reins 28 and 29 are simultaneously pulled until the main clutch is disengaged and the interlock released to allow shifting of the speed changing clutch. The third rein 43 is now pulled which throws the transmission into low gear. If it is desired to run on low gear the main clutch is allowed to engage, by gradually loosening reins 28 and 29, and the tractor moves forward. If desired to run on high gear, rein 43 must be pulled a second time while the clutch is held out of engagement by the other two reins. The tractor may be stopped at any time, by pulling reins 28 and 29 far enough to release the clutch, and may be backed by pulling the reins still further. If rein 28 is pulled singly the tractor is steered to the left and if rein 29 is pulled singly it is steered to the right. The pull on the two reins may be varied while both are held taut to hold the clutch out of engagement or the reverse gearing engaged; thus the steering gear may be operated whether the tractor is moving forward, standing still or going backward.

After the transmission is in gear the tractor is ordinarily controlled by reins 28 and 29 and the third rein is used only when necessary to change speed or when it is desired to leave the tractor standing without holding the clutch out of engagement. The third rein need not be held continually by the driver but can hang where it will be within reach when needed.

By the arrangement of the interlocking device, it is impossible to shift the transmission into gear unless the power is thrown off by conjoint pull on reins 28 and 29 but it may be thrown out of gear into neutral without disconnecting the power. Thus if the reins 28 and 29 should get out of the driver's reach, or for any other reason the clutch could not be released, the tractor could be stopped by pulling the gear shifting rein 43.

From the foregoing description it is apparent that a tractor may be completely controlled by the three reins while the driver is located in a position where he can easily attend to the implement being used.

Obviously, changes in the details of construction may be made without departing from the spirit of the invention, and I do not care to limit myself to any particular form or arrangement of parts.

What I claim is:—

1. In a motor vehicle having a power plant, transmission mechanism, and a dirigible bearing wheel adapted to swing in either direction, means for swinging the wheel in either direction, means normally connecting the swinging means with the power plant, and a manually operable, angularly movable and bodily shiftable member having selective connections with the wheel swinging means and controlling the latter to swing the wheel in accordance with the position given the directing member, said member being operative to render the transmission mechanism temporarily inactive when the member is bodily shifted, said transmission mechanism including a selective change speed mechanism, and means independent of the member, for rendering the selected speed active, said latter means being operable at will in the presence of the bodily shifting movements of the member.

2. In a motor vehicle having a power plant and a dirigible bearing wheel with power connections to the power plant for turning in either direction, means for driving the vehicle including a throw out clutch and a manually operable, bodily shiftable and angularly movable directing member having selective connections with the bearing wheel to throw the latter into selective engagement with the turning mechanism and throwing the clutch out when shifted bodily.

3. In a motor vehicle having a power plant, transmission mechanism for driving the machine and a dirigible driving wheel adapted to swing in either direction, a clutch for disconnecting the transmission mechanism, means operable by the power plant for swinging the wheel, and a manually operable directing member angularly movable on the shiftable pivot member, the pivot member being adapted to throw the transmission clutch out of gear when the manually operable member is shifted bodily, and selective connections between the angularly movable directing member and the wheel swinging means to control the latter to swing the wheel in accordance with the position assumed by the directing member.

4. In a tractor, a combined traction bearing and driving wheel, a power plant, mechanism for rotating the wheel in either direction, driven by the power plant, mechanism for swinging the wheel in either direction, driven by the power plant, rotatable control shaft and a single controlling member having bodily shiftable and angular adjustments, operatively connected to the mechanism through said shaft for selectively turning the wheel into a position corresponding to that assumed by the controlling member and for disconnecting the driving mechanism when shifted bodily.

5. In a tractor, a power plant, a dirigible traction bearing wheel adapted to swing in either direction, reversing mechanism connecting the traction bearing wheel with the power plant, a reversing lever controlling the transmission mechanism, means operated by the power plant for swinging the wheel, a manually operable and angularly movable directing member, selective connections with the wheel swinging means and the controlling member to swing the wheel in accordance with the position given the directing member, and connections between the lever and the controlling member whereby the shifting of the directing member on its center of motion bodily regardless of its angular position shifts the lever from direct position through a neutral position to reverse position.

6. In a motor, a dirigible traction bearing wheel, a power plant operatively connected thereto to turn the latter and to swing it in either direction, a reversing mechanism, connecting the traction bearing wheel with the power plant, a bodily shiftable directing member, selective connections between the wheel swinging means and the directing member whereby the wheel swinging means turns the wheel in correspondence to the angular movement of the directing member, means independent of the directing member for controlling the change speed mechanism, and means controlling the reversing mechanism, connected to the directing member whereby the bodily shifting of the latter renders the reverse mechanism controlling means active to permit adjustment of the speed change mechanism.

7. In a tractor, a power plant, a dirigible traction bearing wheel, transmission mechanism of the reduction and reversing type connecting the power plant with the wheel for rotating the latter, means operated by the power plant for swinging the wheel in either direction, a shiftable pivot member, a directing member angularly movable on the pivot member, selective connections between the directing member and the wheel swinging mechanism controlling the latter to turn the wheel in accordance with the position given the directing member, and a reversing control member for the transmission mechanism, and connections between the pivot member and change speed controlling member to selectively throw the transmission mechanism into operation in accordance with the bodily shifting position assumed by the directing member.

8. In a tractor, a power plant, reduction and reversing transmission mechanism operated by the power plant, a dirigible traction bearing wheel operated by the transmission mechanism, a reversing member controlling the transmission mechanism, mechanism adapted to swing the wheel in either direction, including a forward clutch and a reverse clutch, means for operating the clutches selectively, a shiftable pivot member connected to the transmission mechanism controlling member to shift the latter from forward to reverse position, and a directing member mounted on the pivot member and connected to the clutch operating member whereby the shifting of the directing member on the pivot produces a corresponding change in position in the traction bearing wheel.

9. In a tractor, a power plant, a dirigible traction bearing wheel, reversing mechanism for driving the wheel in either direction from the power plant, an oscillatory member operatively connected to the reversing mechanism for shifting the latter, mechanism operated by the power plant for swinging the wheel and a directing member pivoted on the shifting member and connected to the swinging means for turning the wheel in accordance with the angular position given the directing member.

10. In a tractor, a power plant, a dirigible traction bearing wheel, means for driving the wheel in either direction from the power plant, an oscillatory member operatively connected to the reversing mechanism for shifting the latter, mechanism operated by the power plant for swinging the wheel, a directing member pivoted on the shifting member and connected to the swinging means for turning the wheel in accordance with the angular position given the directing member, and flexible connections from the two arms of the directing member for manipulating the latter and shifting the same together with the member on which it is pivoted from forward to reverse position.

11. In a tractor, a power plant, a dirigible traction bearing wheel, reversing means for driving the wheel in either direction from the power plant, a clutch in the reversing mechanism disconnecting the latter, an oscillatory member operatively connected to the reversing mechanism for shifting the latter and for throwing out the clutch when in intermediate position, mechanism operated by the power plant for swinging the wheel, and a directing member pivoted on the shifting member and connected to the swinging means for turning the wheel in accordance with the angular position given the directing member, regardless of the position assumed by the member on which it is pivoted.

12. In a tractor, a power plant, a dirigible traction bearing wheel, reversing mechanism for driving the wheel in either direction from the power plant, an oscillatory member operatively connected to the reversing mechanism for shifting the latter, mechanism operated by the power plant for swinging the wheel, a directing member pivoted on the shifting member, selective mechanism connected to the swinging means for turning the wheel in accordance with the angular position given the swinging member, and adapted to operate regardless of the position assumed by the member on which the directing member is pivoted.

13. In a tractor, a power plant, a dirigible traction bearing wheel, reversing mechanism for driving the wheel in either direction from the power plant, an oscillatory member operatively connected to the reversing mechanism for shifting the latter, a throw out clutch controlled by the oscillatory member when in a certain position, mechanism operated by the power plant for swinging the wheel, and a directing member pivoted on the shifting member and connected to the swinging means by selective mechanism for turning the wheel in accordance with the angular position given the directing member.

14. In a tractor, a power plant, a dirigible traction bearing wheel, change speed and reversing mechanism for driving the wheel in either direction from the power plant including a throw out clutch, an oscillatory member operatively connected to the reversing mechanism for shifting the latter and throwing out the clutch between forward and reverse positions, mechanism operated by the power plant for swinging the wheel, a directing member pivoted on the shifting member, selective mechanism connecting the directing member with the swinging mechanism whereby the wheel may be shifted into a position corresponding with the angular position given by the directing member, and means for manually controlling the directing member and shifting the latter and the oscillatory member bodily, from the forward to the reverse position of the latter member and through the throw out position, the control and selective mechanism for operating the wheel swinging member being adapted to act to swing the wheel regardless of the position assumed by the member on which the directing member is pivoted.

15. In a tractor, a power plant, a dirigible traction bearing wheel, change speed transmission mechanism driven thereby, a rotatable member operated by the transmission mechanism, a forward clutch adapted to operatively connect the member and wheel, a reverse clutch adapted to operatively connect the member and wheel, an oscillatory member coupled to the clutches and adapted to throw one clutch into operative position when in forward position, and to throw the other clutch into operation when in reverse position, mechanism operated by the power plant adapted to swing the wheel in either direction, a member pivoted on the oscillatory member and selectively connected to the wheel swinging means whereby the latter moves the wheel into position corresponding to that given the oscillatory member, and flexible connections for manipulating the oscillatory member, and for shifting the swinging member into the position desired, the latter member operating to control the wheel to turn in a direction assumed by the oscillatory member.

16. In a tractor, a power plant, a dirigible traction bearing wheel, change speed transmission mechanism driven by the power plant, a rotatable member operated by the transmission member, a forward clutch adapted to operatively connect the member and traction wheel, a reverse clutch adapted to operatively connect the member and traction wheel, an oscillatory member adapted to throw one clutch into operation when in forward position, and the other into engagement when in reverse position and to disengage both clutches when in neutral position, mechanism driven by the power plant for swinging the wheel in either direction, and means carried by the oscillatory member and adapted to selectively throw the swinging mechanism into operation to turn the wheel to correspond in position to the latter member regardless of the position assumed by the member on which the directing member is pivoted.

17. In a tractor, a power plant, a dirigible traction bearing wheel, change speed transmission mechanism, a member driven thereby, a power clutch adapted to operatively connect the member and the wheel, a reverse clutch adapted to operatively connect the member and the wheel, an oscillatory member adapted to throw one clutch into operation when in forward position and the other into engagement when in reversing position and to disengage both clutches when in neutral position, mechanism for swinging the wheel in either direction, driven from the power plant, and including a pair of clutches driving in opposite direction, means for throwing either clutch into engagement, a member movable on the oscillatory member having engagement with both clutches and adapted to throw either one into engagement regardless of the position of the oscillatory member.

18. In a tractor, a power plant, a dirigible traction bearing wheel, change speed mechanism driven thereby, a rotatable member driven from the transmission mechanism, a forward clutch adapted to operatively connect the member and the wheel, a reverse clutch adapted to operatively connect the member and the wheel, a reciprocating member adapted to throw either clutch into operation, mechanism driven from the power plant and adapted to swing the wheel in either direction including a right hand clutch and a left hand clutch, and a swinging and directing member mounted on the oscillatory member, and operatively connected to the clutches to throw them into engagement selectively whereby the traction wheel assumes a position corresponding to the position taken by the directing member.

19. In a tractor, a dirigible traction bearing wheel, a power plant operatively connected thereto to turn the latter and to swing it in either direction, a slotted lever operatively connected to the turning mechanism, a pivot shaft reciprocable in a bearing slot of the machine, an arm carried by the pivot shaft in engagement with the slot of the lever for swinging the latter in any position assumed by the shaft, a directing member secured on the pivot shaft and adapted to swing the latter, and flexible connections between the directing member and the operator's station for shifting the latter bodily in the slot and swinging it angularly with the pivot shaft.

20. In a tractor, a power plant, a dirigible traction bearing wheel, a bearing frame in which the bearing wheel is journaled that is mounted in the tractor and adapted to swing therein, a worm driven shaft, sprocket wheel and chain connections between the worm shaft and the bearing frame for swinging the wheel in either direction, a power driven shaft, a forward clutch and a reverse clutch adapted to gear the power driven member with the worm drive selectively, a slotted lever, link and rock arm connections leading therefrom, a clutch shifting member controlling both clutches and operated by the link and rock arm connections, to throw in either clutch selectively, a pivot shaft reciprocable on the machine transversely to its axis provided with a lever arm engaging the slot of the lever, and adapted to swing the lever when the shaft is turned, and a directing member secured to the pivot shaft and adapted to be swung therewith in either direction, whereby the bearing frame and wheel are turned into a position corresponding to the angular position given to the directing member.

21. In a tractor, a power plant, change speed and reversing transmission mechanism connected therewith including a main clutch, mechanism for throwing out the clutch, an oscillatory member connected to the mechanism to shift the same from forward to reverse and arranged to operate the clutch releasing means to open the clutch when the lever is in a neutral position, a pivot shaft reciprocable transversely to it's axis in the machine, connected to the slotted end portions of the clutch operating and transmission mechanism controlling lever, a directing member secured to the pivot shaft, an arm extending from the pivot shaft engaging the slotted arm of a lever swinging at right angles to the shaft, mechanism for turning the wheel in the frame including reversing members and connections between the slotted lever and reversing means whereby the wheel assumes a position corresponding to the angular position given to the directing member.

22. A tractor, a power plant, a dirigible bearing wheel, power operated means for turning the wheel in either direction, forward and reverse mechanism for the said means, a lever connected to the forward and reversing means for controlling the latter having a slot in the end thereof parallel to the pivot axis of the lever, a pivot shaft reciprocable in the machine in a guide slot transverse to the axis thereof and parallel to the slot of the lever arm, an arm extending from the pivot shaft engaging the slot of the lever, a directing member secured to the lever, and flexible connections for manipulating the lever arm, whereby the wheel assumes a position corresponding to the angular position of the directing member regardless of the position of the pivot shaft in the bearing guide slot thereof.

23. In a tractor, a power plant, a dirigible traction bearing wheel, transmission mechanism operated by the power plant and adapted to be selectively connected to the wheel to drive the latter forward and back, mechanism driven by the power plant for swinging the wheel in the tractor, including forward and reverse clutch, a clutch yoke for selectively throwing the clutches into operation, a lever having suitable connection with the clutch member and selectively operating the latter, a slotted arm of the lever having a guide groove parallel to the axis thereof, a pivot shaft reciprocable in a guide groove of the tractor that is parallel to the groove of the slotted arm of the lever, a rock arm extending from the pivot shaft and engaging into the slot of the lever, a directing member secured to the pivot shaft and adapted to turn therewith, means for shifting the transmission mechanism and for reversing the latter, and an oscillatory member operatively connected to the pivot shaft for controlling the transmission mechanism, whereby the bodily movement of the shaft and directing member in the guide slot thereof shifts the transmission mechanism regardless of the angular position assumed by the directing member.

24. In a tractor, the combination of a revoluble control shaft, a pair of reins, means operatively connecting said reins with said shaft whereby a pull on the reins will turn said shaft from "forward" to "neutral" or "reverse" position, and means for moving said shaft to forward position on a slackening of the reins.

25. In a tractor, the combination of a revoluble control shaft, an arm carried by the shaft, a pair of reins operatively connected to said arm for turning the same by a pull on both reins, a steering control member, and means for connecting said steering control member to said reins to be actuated thereby by a pull on either rein.

26. In a tractor, the combination of a revoluble control shaft, an arm carried by said shaft, a lever pivotally secured intermediate its end to said arm, reins secured to the ends of said lever whereby a pull on the reins will turn said shaft from "forward" to "neutral" or "reverse" position, means for moving said shaft to "forward" position on a slackening of the reins, a steering control member, and means connecting said steering control member with said lever to operate said member by a pull on either rein.

27. In a tractor, a power plant, a dirigible traction bearing wheel, reversing mechanism for driving the wheel in either direction from the power plant including a throw out clutch, an oscillatory member operatively connected to the reversing mechanism for shifting the latter and throwing out the clutch between forward and reverse positions, mechanism operated by the power plant for swinging the wheel, a directing member pivoted on the shifting member, selective mechanism connecting the directing member with the swinging mechanism whereby the wheel may be shifted into a position corresponding with the angular position given by the directing member and shifting the latter and the oscillatory member bodily, from the forward to the reverse position of the latter member and through the throw out position, the controlling and selective mechanism for operating the wheel swinging member being adapted to act to swing the wheel regardless of the position assumed by the member on which the directing member is pivoted.

28. In a tractor, the combination of transmission mechanism having fixed forward, neutral and reverse positions only; a pair of reins; and means connected with the transmission and operated by the reins whereby a pull on both reins will shift said mechanism from forward directly to neutral position and from neutral directly to reverse position.

29. In a tractor the combination of transmission mechanism having fixed forward, neutral, and reverse positions only; a steering control member; a pair of reins; and mechanism operatively connecting said steering control member and transmission mechanism to the pair of reins whereby a pull on both reins moves the transmission mechanism from forward directly to neutral position and from neutral directly to reverse position, and a pull on either rein operates the steering mechanism.

30. In a tractor, the combination of transmission mechanism having fixed forward, neutral and reverse positions; a pair of reins; and means connected with the transmission and operated by the reins whereby a pull on both reins will shift said mechanism from forward directly to neutral position and from neutral directly to reverse position.

31. In a tractor, the combination of transmission mechanism having fixed forward, neutral and reverse position; a pair of reins; and means connected with the transmission and operated by the reins whereby a pull on both reins will shift said mechanism from forward directly to neutral position and from neutral directly to reverse position and a release of said reins will shift said mechanism to neutral or forward position.

32. In a tractor, the combination of a revoluble control shaft, a pair of reins, means operatively connecting said reins with said shaft whereby a pull on the reins will turn said shaft from "forward" to "neutral" or "reverse" position, means for moving said shaft to forward position on a slackening of the reins, a steering control member, and means operatively connecting said steering control member to said reins to be actuated thereby by a pull on either rein.

33. In a tractor, the combination of a revoluble control shaft, an arm carried by said shaft, a lever pivotally secured intermediate its ends to said arm, reins secured to the ends of said lever for controlling the operation of said arm and shaft by a pull on both reins, a steering control member, and means connecting said steering control member with said lever to operate said member by a pull on either rein.

In testimony whereof I affix my signature in presence of two witnesses.

RALPH J. STIMSON.

Witnesses:
  ANNA M. DORR,
  LEWIS E. FLANDERS.